US012191607B2

(12) United States Patent
Li et al.

(10) Patent No.: US 12,191,607 B2
(45) Date of Patent: Jan. 7, 2025

(54) ELECTRIC CONNECTOR ASSEMBLY

(71) Applicants: Tyco Electronics (Shanghai) Co. Ltd, Shanghai (CN); Tyco Electronics Japan G.K., Kawasaki (JP)

(72) Inventors: Xinlei (Tony) Li, Shanghai (CN); Fengping (Alex) Xu, Shanghai (CN); Qiaoli (Cherie) Chen, Shanghai (CN); Junya Tsuji, Kawasaki (JP)

(73) Assignees: Tyco Electronics (Shanghai) Co. Ltd, Shanghai (CN); Tyco Electronics Japan G.K., Kawasaki (JP)

( * ) Notice: Subject to any disclaimer, the term of this patent is extended or adjusted under 35 U.S.C. 154(b) by 328 days.

(21) Appl. No.: 17/743,641

(22) Filed: May 13, 2022

(65) Prior Publication Data

US 2022/0368086 A1 Nov. 17, 2022

(30) Foreign Application Priority Data

May 13, 2021 (CN) ......................... 202110521458.1

(51) Int. Cl.

*H01R 13/6597* (2011.01)
*H01R 12/72* (2011.01)
*H01R 13/6471* (2011.01)
*H01R 43/18* (2006.01)

(52) U.S. Cl.

CPC ....... *H01R 13/6597* (2013.01); *H01R 12/721* (2013.01); *H01R 13/6471* (2013.01); *H01R 43/18* (2013.01)

(58) Field of Classification Search

CPC .............. H01R 13/6597; H01R 12/721; H01R 13/6471; H01R 43/18; H01R 13/6587; H01R 12/79; H01R 12/716; H01R 13/652; H01R 13/40; H01R 13/502; H01R 13/6581

See application file for complete search history.

(56) References Cited

U.S. PATENT DOCUMENTS

| | | | | |
|---|---|---|---|---|
| 9,356,401 | B1 * | 5/2016 | Horning | H01R 13/6587 |
| 9,985,389 | B1 | 5/2018 | Morgan et al. | |
| 10,965,062 | B1 * | 3/2021 | Miller | H05K 1/0218 |
| 2009/0011624 | A1 * | 1/2009 | Yamazaki | H01R 12/707 439/99 |
| 2013/0309881 | A1 * | 11/2013 | Tagawa | H01R 12/716 439/83 |
| 2017/0194748 | A1 * | 7/2017 | Peng | H01R 13/6581 |
| 2019/0115697 | A1 * | 4/2019 | Sakaizawa | H01R 13/6597 |
| 2020/0169019 | A1 * | 5/2020 | Cheng | H01R 12/724 |
| 2020/0212635 | A1 * | 7/2020 | Chen | H01R 12/73 |
| 2021/0075143 | A1 * | 3/2021 | Laurx | H01R 43/205 |
| 2021/0175664 | A1 * | 6/2021 | Cheng | H01R 13/05 |
| 2023/0387632 | A1 * | 11/2023 | Ikari | H01R 12/716 |

* cited by examiner

*Primary Examiner* — Travis S Chambers

(74) *Attorney, Agent, or Firm* — Barley Snyder

(57) ABSTRACT

An electric connector assembly includes an insulating housing, a plurality of rows of contact terminals disposed in the insulating housing and including a plurality of signal terminals and a plurality of ground terminals, and a conductive shell assembled on the insulating housing. The conductive shell contacts and is connected with the ground terminals to electrically connect the ground terminals together.

22 Claims, 3 Drawing Sheets

ELECTRIC CONNECTOR ASSEMBLY

CROSS-REFERENCE TO RELATED APPLICATION

This application claims the benefit of the filing date under 35 U.S.C. § 119(a)-(d) of Chinese Patent Application No. 202110521458.1, filed on May 13, 2021.

FIELD OF THE INVENTION

Embodiments of the present disclosure relate generally to an electric connector, and particularly to an electric connector assembly which is capable of transmitting data at a high-frequency data transmission rate.

BACKGROUND

A conventional high-speed electric connector assembly generally includes a plastic housing and contact terminals (including signal terminals and ground terminals) assembled in the plastic housing. Two circuit boards are connected to each other through these contact terminals. In order to ensure the transmission performance of high-frequency signals, the conventional electric connector assembly has very high requirements on the manufacturing tolerance of the plastic housing. When conventional manufacturing technology is used, requirements for manufacturing accuracy will be very strict, thereby increasing manufacturing difficulty and cost. In addition, resonance generated during transmission of the high-frequency signals in the conventional high-speed electric connector assembly also needs to be alleviated.

SUMMARY

An electric connector assembly includes an insulating housing, a plurality of rows of contact terminals disposed in the insulating housing and including a plurality of signal terminals and a plurality of ground terminals, and a conductive shell assembled on the insulating housing. The conductive shell contacts and is connected with the ground terminals to electrically connect the ground terminals together.

BRIEF DESCRIPTION OF THE DRAWINGS

The invention will now be described by way of example with reference to the accompanying Figures, of which.

and

Figure 5:
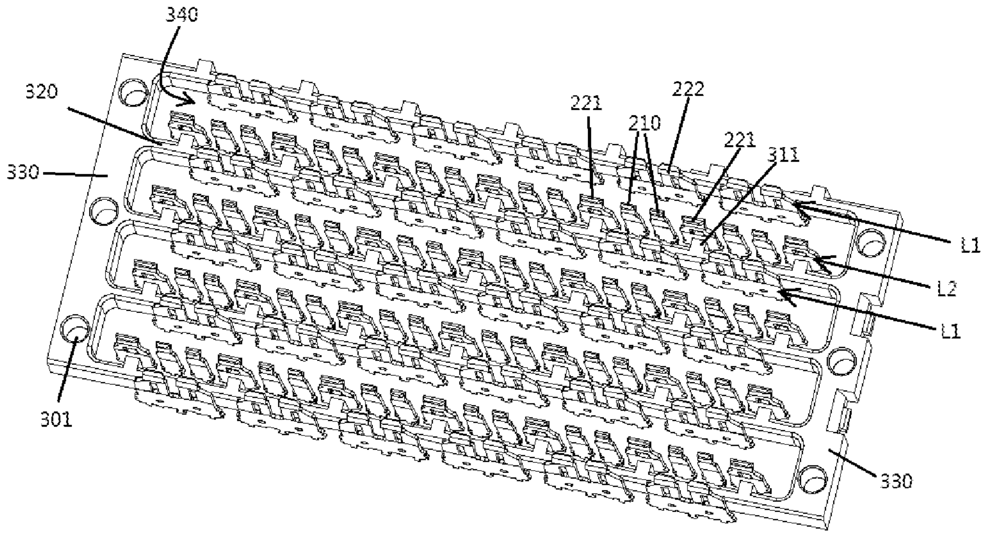
FIG. 5 is a perspective view of a plurality of contact terminals and the conductive shell.
Figure 6:
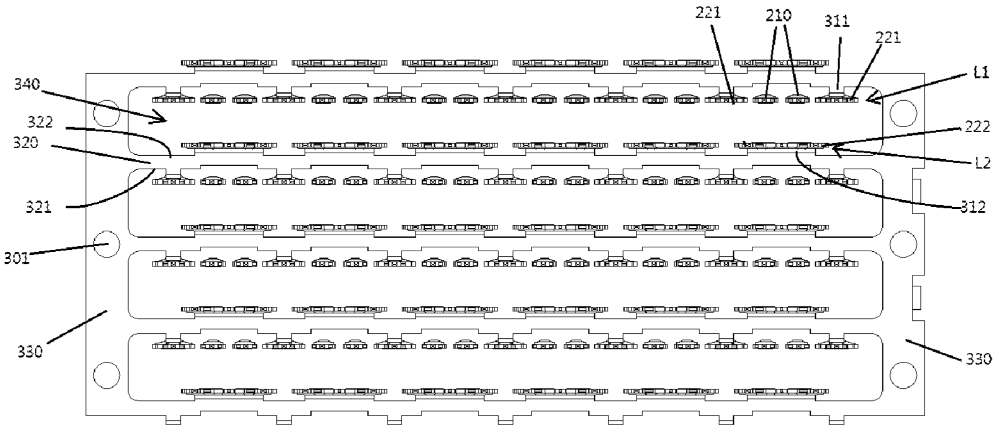

FIG. 6 is a top view of the contact terminals and the conductive shell of FIG. 5.

DETAILED DESCRIPTION OF THE EMBODIMENT(S)

The technical solutions of the present disclosure will be further specifically described below with reference to embodiments in conjunction with the drawings. The same or similar elements are indicated by the same or similar reference signs in the description. The following description of the embodiments of the present disclosure with reference to the drawings is intended to explain the general inventive concept of the present disclosure and should not be construed as a limitation on the present disclosure.

In addition, in the following detailed description, for purposes of explanation, numerous specific details are set forth in order to provide a thorough understanding of the embodiments of the present disclosure. It will be apparent, however, that one or more embodiments may be implemented without these specific details. In other instances, well-known structures and devices are schematically shown in order to simplify the drawing.

It should be noted that each kind of components/structures (such as first ground terminals, second ground terminals, first conductive protrusions, second conductive protrusions, upright walls, terminal passages) in the electric connector assembly according to the present disclosure are presented in multiple components/structures, and for the purpose of clear illustration in the drawings, only one or two of each kind of components/structures are indicated by reference signs. For example, only one first ground terminal 221, one second ground terminal 222, one first conductive protrusion 311, one second conductive protrusion 312, one upright with 320, and one terminal passage 340 are indicated in FIG. 6. However, it would be appreciated by those skilled in the art that these reference signs can also refer to components/structures that are not indicated in the drawings but are the same as those indicated by these reference signs.

As shown in the embodiment of FIGS. 1 to 6, there is provided an electric connector assembly 1000 including: an insulating housing 100, a plurality of rows of contact terminals L1, L2 disposed in the insulating housing 100, and at least one conductive shell 300. The plurality of rows of contact terminals L1, L2 include a plurality of signal terminals 210 and a plurality of ground terminals 221, 222, as shown in FIGS. 5 and 6.

Figure 4:
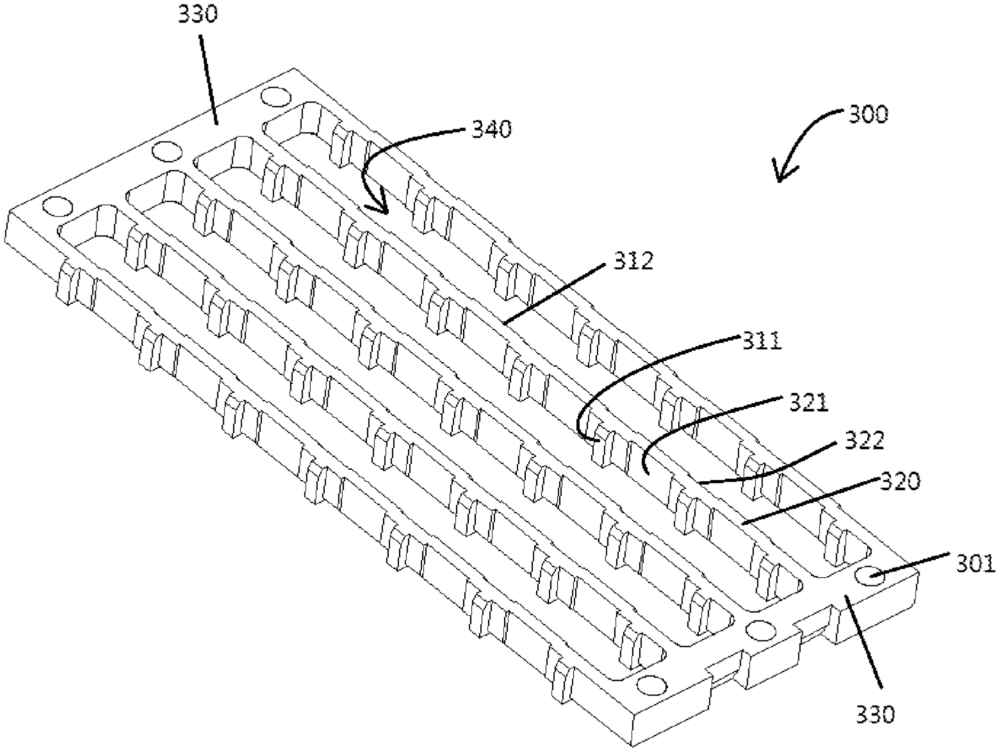
FIG. 4 is a perspective view of a conductive shell of the electric connector assembly.

The conductive shell 300 is assembled on the insulating housing 100. The conductive shell 300 is respectively contacted and connected with the corresponding plurality of ground terminals 221, 222 to electrically connect the plurality of ground terminals 221, 222 together. As shown in FIG. 4, the conductive shell 300 has a plurality of conductive protrusions 311, 312, and the plurality of conductive protrusions 311, 312 are respectively contacted and connected with the corresponding plurality of ground terminals 221, 222, as shown in FIGS. 5 and 6, to electrically connect the plurality of ground terminals 221, 222 together.

In the electric connector assembly 1000, the conductive shell 300 is formed on the basis of the insulating housing 100, and all of the ground terminals 221, 222 are connected together in such a way that the conductive shell 300 contacts the ground terminals 221, 222. Thereby, the electrical performance of the entire electric connector assembly 1000 is improved. In addition, the transmission performance of the electric connector assembly 1000 for high-frequency signals is improved, and at the same time, the high requirements on the manufacturing tolerance of the housing 100 which are imposed in order to ensure the transmission performance of the high-frequency signals in the related art are relatively reduced, thus alleviating the influence of the manufacturing tolerances of the insulating housing 100 and all of components (such as the terminals) on the transmission of the high-frequency signals.

As shown in FIG. 4, the conductive shell 300 includes: a plurality of upright walls 320 arranged side by side and parallel to each other; two end walls 330 respectively connecting the plurality of upright walls 320 at opposite ends of the plurality of upright walls 320; and a plurality of terminal passages 340, each of which is delimited by every two adjacent ones of the plurality of upright walls 320 and the two end walls 330 together and through which the plurality of signal terminals 210 and the plurality of ground terminals 221, 222 pass. The plurality of conductive protrusions 311, 312 are formed on each of the plurality of upright walls 320, and the plurality of conductive protrusions 311, 312 are respectively contacted and connected with the corresponding plurality of ground terminals 221, 222 passing through the plurality of terminal passages 340. In other words, in the electric connector assembly 1000, the plurality of signal terminals 210 and the plurality of ground terminals 221, 222 are configured to pass through the terminal passages 340 formed in the conductive shell 300, while the plurality of ground terminals 221, 222 are respectively contacted and connected with the plurality of conductive protrusions 311, 312 of the conductive shell 300 to electrically connect the plurality of ground terminals 221, 222 together, thereby improving the electric shielding performance of the electric connector assembly 1000.

In an embodiment, the conductive shell 300 may be formed integrally with the plurality of conductive protrusions 311, 312 to simplify the manufacturing process.

As shown in the embodiment of FIG. 4, each of the plurality of upright walls 320 has opposite first and second side surfaces 321, 322 respectively facing two corresponding adjacent ones of the plurality of terminal passages 340, and the plurality of conductive protrusions 311, 312 further include a plurality of first conductive protrusions 311 and a plurality of second conductive protrusions 312. The plurality of first conductive protrusions 311 are formed on the first side surfaces 321 and the plurality of second conductive protrusions 312 are formed on the second side surfaces 322. In other words, the conductive protrusions 311, 312 are disposed on both sides of each upright wall 320. Except for outer side surfaces of two outermost upright walls 320, the conductive protrusions 311, 312 on both sides of each upright wall 320 protrude towards the corresponding terminal passages 340 to be contacted and connected with the contact terminals located in the terminal passages 340.

As shown in FIGS. 5 and 6, in the illustrated exemplary embodiment, the plurality of rows of contact terminals L1, L2 further include a first row of contact terminals L1 and a second row of contact terminals L2, which are arranged alternately, and the plurality of ground terminals 221, 222 further include a plurality of first ground terminals 221 and a plurality of second ground terminals 222. The first row of contact terminals L1 are formed by alternately arranging one first ground terminal 221 and one pair of signal terminals 210, and the second row of contact terminals L2 are formed by arranging a plurality of second ground terminals 222. The first row of contact terminals L1 are arranged in a corresponding one of the plurality of terminal passages 340 faced by the first side surface 321 of each of the plurality of upright walls 320, and the second row of contact terminals L2 are arranged in a corresponding one of the plurality of terminal passages 340 faced by the second side surface 322 of each of the plurality of upright walls 320. In other words, as shown in the figures, one first row of contact terminals L1 and one second row of contact terminals L2 are disposed in each terminal passage 340.

Each of the plurality of first conductive protrusions 311 is contacted and connected with a corresponding one of the plurality of first ground terminals 221, and each of the plurality of second conductive protrusions 312 is contacted and connected with a corresponding one of the plurality of second ground terminals 222. In other words, the ground terminals 221 and 222 are arranged around each pair of signal terminals 210, and the ground terminals arranged around each pair of signal terminals 210 are electrically connected together through the conductive protrusions 311 or 312 to provide improved electric shielding performance for each pair of signal terminals 210. Therefore, with the electric connector assembly 1000, the resonance generated during transmission of the high-frequency signals is also alleviated, so that the signals are transmitted more stably.

In the shown embodiment, the first conductive protrusion 311 has a different shape from the second conductive protrusion 312. Specifically, in the embodiment shown in FIGS. 4 and 6, the first conductive protrusion 311 may take the shape of a two-level step protruding from the side of the upright wall 320, and the second conductive protrusion 312 may take the shape of a one-level step protruding from the side of the upright wall 320. Further, the shapes and/or sizes of the first and second conductive protrusions 311, 312 are adapted to the shapes and/or sizes of the first and second ground terminals 221, 222 respectively contacted and connected with them.

In the shown embodiment, the first ground terminal 221 has a different shape from the second ground terminal 222. Specifically, in the embodiment shown in FIGS. 4 and 6, since the positions of the first ground terminal 221 and the second ground terminal 222 relative to the pair of signal terminals 210 are different from each other, the shapes of the first ground terminal 221 and the second ground terminal 222 are also different from each other to better improve the electric shielding performance.

In addition, as shown in FIGS. 1 to 6, in the illustrated exemplary embodiment, one of the conductive shell 300 and the insulating housing 100 is formed with a positioning hole 301, and the other of the conductive shell 300 and the insulating housing 100 is provided with a positioning column 101, and the positioning column 101 is inserted in the positioning hole 301 to fix the conductive shell 300 to the insulating housing 100. In the exemplary embodiment shown in the figures, positioning holes 301 are formed in the two opposite end walls 330 of the conductive shell 300, while positioning columns 101 are disposed at positions corresponding to the positioning holes 301 on the insulating housing 100. In this way, the conductive shell 300 can be more effectively fixed and positioned on the insulating housing 100.

Figure 3:
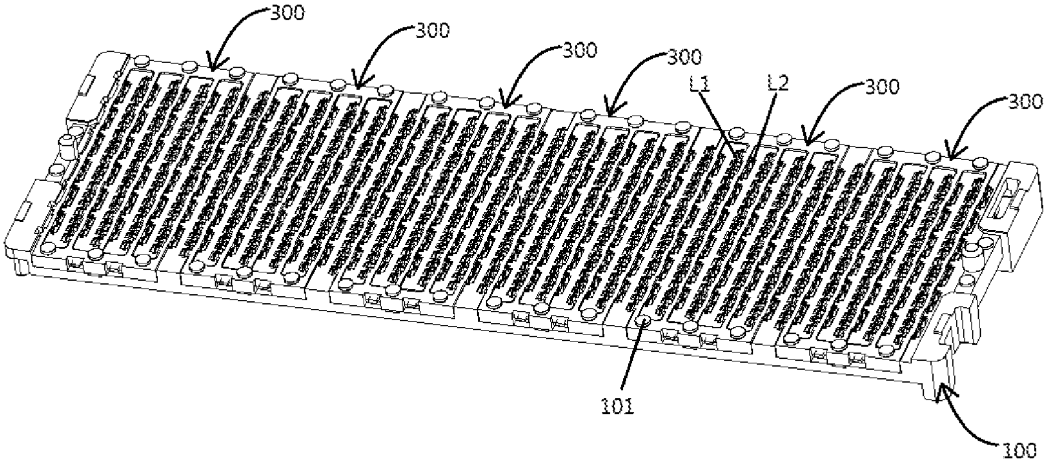
FIG. 3 is a perspective view of the electric connector assembly without a bottom plate.

In an embodiment, a plurality of conductive shells 300 are formed side by side and parallel to each other on the insulating housing 100. As shown in FIG. 3, six conductive shells 300 are formed side by side and parallel to each other on the insulating housing 100. Of course, in other embodiments, any other number of conductive shells 300 may also be formed on the insulating housing 100 according to actual requirements. In addition, it is to be noted that, since the conductive protrusions 311, 312 are disposed on both side surfaces of each upright wall 320 of the conductive shell 300, between the outermost upright walls of two adjacent conductive shells 300 there are also the conductive protrusions 311, 312 which may be used to be contacted and connected with the ground terminals 221, 222 located between the two adjacent conductive shells 300.

In an embodiment, the conductive shell 300 is formed by a Physical Vapor Deposition (PVD) technology or a Molded Interconnect Device (MID) technology, and is assembled on the insulating housing 100. The MID technology refers to a technology of fabricating or mounting a component with an electrical function on a surface of an injection-molded plastic housing 100, so as to combine the electrical interconnection function of the component with the mechanical support function of the plastic housing 100. Of course, in other embodiments, any other technologies capable of metallizing the surface of the plastic insulating housing 100 may also be used to form the conductive shell 300 on the insulating housing 100.

The insulating housing 100 includes a plastic housing, and the conductive shell 300 includes a metallized shell formed by depositing a layer of metal on the plastic housing. In an exemplary embodiment, the conductive shell 300 may be made by depositing a layer of nickel on the plastic housing. Of course, in other embodiments, the conductive shell 300 may also be made by depositing any other conducting metal material, or may also be made of any other conducting pure metal material by die casting or casting.

Figure 1:
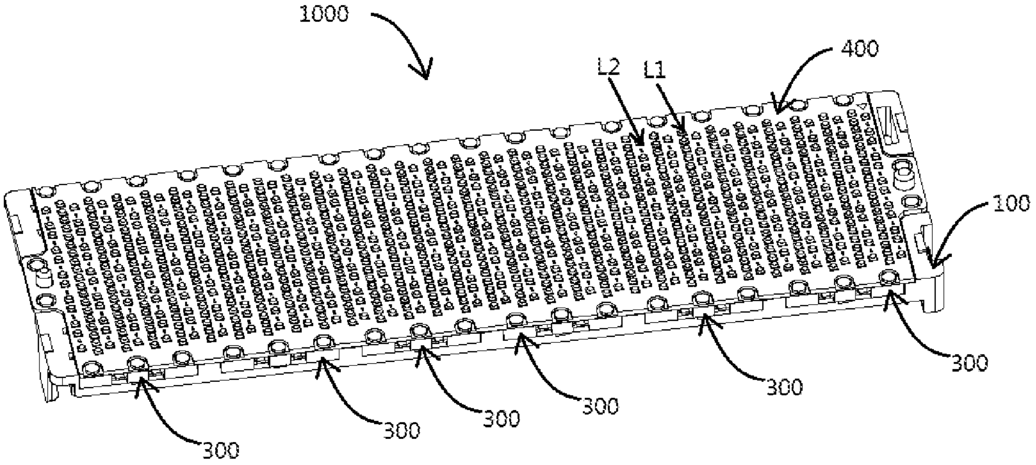
FIG. 1 is a perspective view of an electric connector assembly according to an embodiment.
Figure 2:
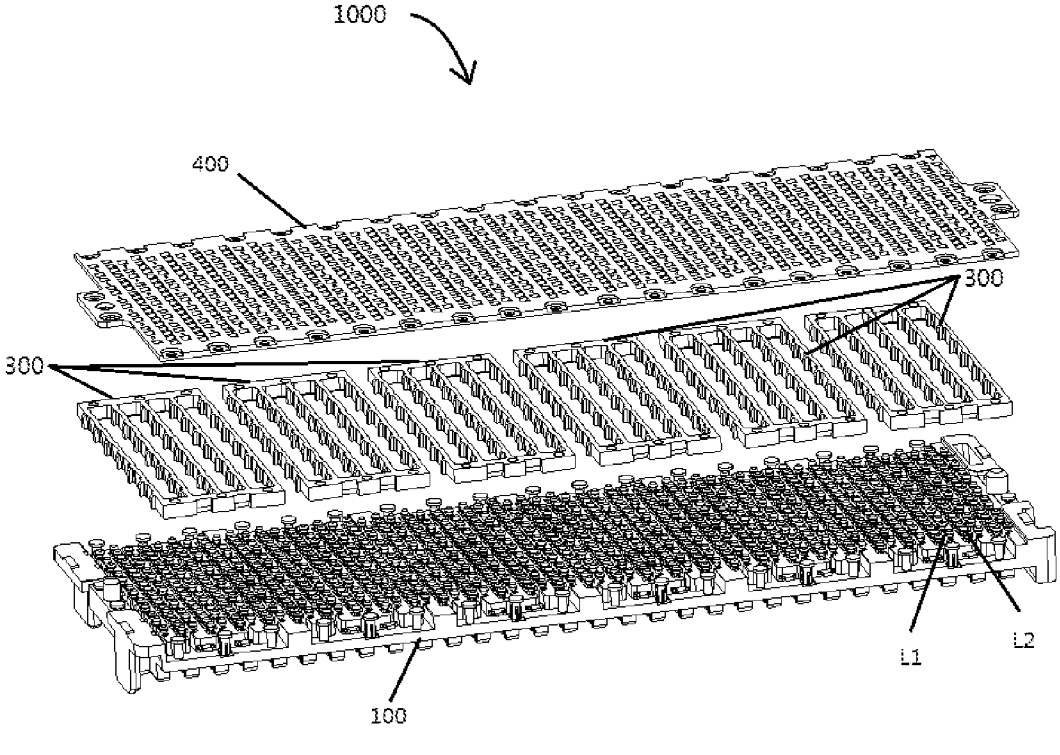
FIG. 2 is an exploded perspective view of the electric connector assembly.

As shown in FIGS. 1 and 2, the electric connector assembly 1000 may further include a bottom plate 400. The bottom plate 400 is disposed above the insulating housing 100 and covers the conductive shell 300 and the plurality of rows of contact terminals L1, L2. By providing the bottom plate 400, the impedance of the entire electrical connector assembly 1000 can be increased, thereby improving the transmission of the high-frequency signals.

It should be appreciated by those skilled in the art that the embodiments described above are all exemplary, and the structures described in the various embodiments can be freely combined unless they conflict in terms of structure or principle. Although the embodiments of the present disclosure have been described with reference to the drawings, the embodiments shown in the drawings are intended to illustrate embodiments of the present disclosure and shall not be construed as a limitation on the present disclosure. Although some embodiments of the present general inventive concept have been shown and described, it would be understood by those skilled in the art that changes may be made therein without departing from the principles and spirit of the present general inventive concept. The scope of the present disclosure is defined in the appended claims and their equivalents.

What is claimed is:

1. An electric connector assembly, comprising:

an insulating housing;

a bottom plate disposed above the insulating housing;

a plurality of rows of contact terminals disposed in the insulating housing and including a plurality of signal terminals and a plurality of ground terminals; and a conductive shell assembled on the insulating housing, the conductive shell contacts and is connected with the ground terminals to electrically connect the ground terminals together.

2. An electric connector assembly, comprising:

an insulating housing;

a plurality of rows of contact terminals disposed in the insulating housing and including a plurality of signal terminals and a plurality of ground terminals; and a conductive shell assembled on the insulating housing, the conductive shell including a plurality of conductive protrusions contacting and connecting with the ground terminals to electrically connect the ground terminals together, wherein the conductive shell has a plurality of conductive protrusions, the conductive protrusions contact and are connected with the ground terminals to electrically connect the ground terminals.

3. The electric connector assembly of claim 2, wherein the conductive shell has:

a plurality of upright walls arranged side by side and parallel to each other;

a pair of end walls connecting the upright walls at opposite ends of the upright walls; and a plurality of terminal passages each delimited by adjacent upright walls and the end walls.

4. The electric connector assembly of claim 3, wherein the signal terminals and the ground terminals extending through the terminal passages.

5. The electric connector assembly of claim 4, wherein the conductive protrusions are formed on the upright walls and contact the ground terminals extending through the terminal passages.

6. The electric connector assembly of claim 2, wherein the conductive shell is formed integrally with the conductive protrusions.

7. The electric connector assembly of claim 3, wherein each of the upright walls has opposite first and second side surfaces facing different adjacent terminal passages, the conductive protrusions include a plurality of first conductive protrusions on the first side surfaces and a plurality of second conductive protrusions on the second side surfaces.

8. The electric connector assembly of claim 7, wherein the rows of contact terminals include a first row of contact terminals and a second row of contact terminals arranged alternately with the first row of contact terminals, and the ground terminals include a plurality of first ground terminals and a plurality of second ground terminals, the first row of contact terminals is formed by alternately arranging one of the first ground terminals and one pair of signal terminals, and the second row of contact terminals is formed from the second ground terminals.

9. The electric connector assembly of claim 8, wherein the first row of contact terminals is arranged in one of the terminal passages faced by the first side surface of each of the upright walls and the second row of contact terminals is arranged in one of the terminal passages faced by the second side surface of each of the upright walls.

10. The electric connector assembly of claim 9, wherein each of the first conductive protrusions contacts and connects with one of the first ground terminals and each of the second conductive protrusions contacts and connects with one of the second ground terminals.

11. The electric connector assembly of claim 7, wherein the first conductive protrusions have a different shape from the second conductive protrusions.

12. The electric connector assembly of claim 8, wherein the first ground terminals have a different shape from the second ground terminals.

13. The electric connector assembly of claim 1, wherein one of the conductive shell and the insulating housing has a positioning hole and the other of the conductive shell and the insulating housing has a positioning column, the positioning column is inserted into the positioning hole to fix the conductive shell to the insulating housing.

14. The electric connector assembly of claim 1, wherein the conductive shell is one of a plurality of conductive shells formed side by side and parallel to each other on the insulating housing.

15. The electric connector assembly of claim 1, wherein the conductive shell is made by a physical vapor deposition technology or a molded interconnect device technology.

16. The electric connector assembly of claim 1, wherein the insulating housing is a plastic housing and the conductive shell is a metallized shell formed by depositing a layer of metal on the plastic housing.

17. The electric connector assembly of claim 16, wherein the conductive shell is made by depositing a layer of nickel on the plastic housing.

18. The electric connector assembly of claim 1, wherein the conductive shell is made of a pure metal material by die casting or casting.

19. The electric connector assembly of claim 1, wherein the bottom plate covers the conductive shell and the rows of contact terminals.

20. The electric connector assembly of claim 2, wherein:

the conductive shell includes:

a plurality of upright walls; and a plurality of terminal passages each delimited by adjacent ones of the upright walls; and the plurality of conductive protrusions include:

a plurality of first conductive protrusions on a first side surface of a first one of the upright walls and extending into a first one of the plurality of terminal passages; and a plurality of second conductive protrusions on a second side surface of the first one of the upright walls opposite the first side, the plurality of second conductive protrusions extending into a second one of the plurality of terminal passages adjacent the first one of the plurality of terminal passages.

21. An electric connector assembly, comprising:

an insulating housing;

a plurality of rows of contact terminals disposed in the insulating housing and including a plurality of signal terminals and a plurality of ground terminals, the rows of contact terminals include a first row of contact terminals and a second row of contact terminals arranged alternately with the first row of contact terminals, and the ground terminals include a plurality of first ground terminals and a plurality of second ground terminals, the first row of contact terminals is formed by alternately arranging one of the first ground terminals and one pair of signal terminals, and the second row of contact terminals is formed from the second ground terminals; and a conductive shell assembled on the insulating housing and contacting the ground terminals to electrically connect the ground terminals together.

22. The electric connector assembly of claim 21, wherein the conductive shell includes:

a plurality of conductive protrusions electrically contacting the ground terminals;

a plurality of upright walls arranged side by side and parallel to each other;

a pair of end walls connecting the upright walls at opposite ends of the upright walls; and a plurality of terminal passages each delimited by adjacent upright walls and the end walls, of the upright walls has opposite first and second side surfaces facing different adjacent terminal passages, the conductive protrusions include a plurality of first conductive protrusions on the first side surfaces and a plurality of second conductive protrusions on the second side surfaces.

* * * * *